2 Sheets--Sheet 2.

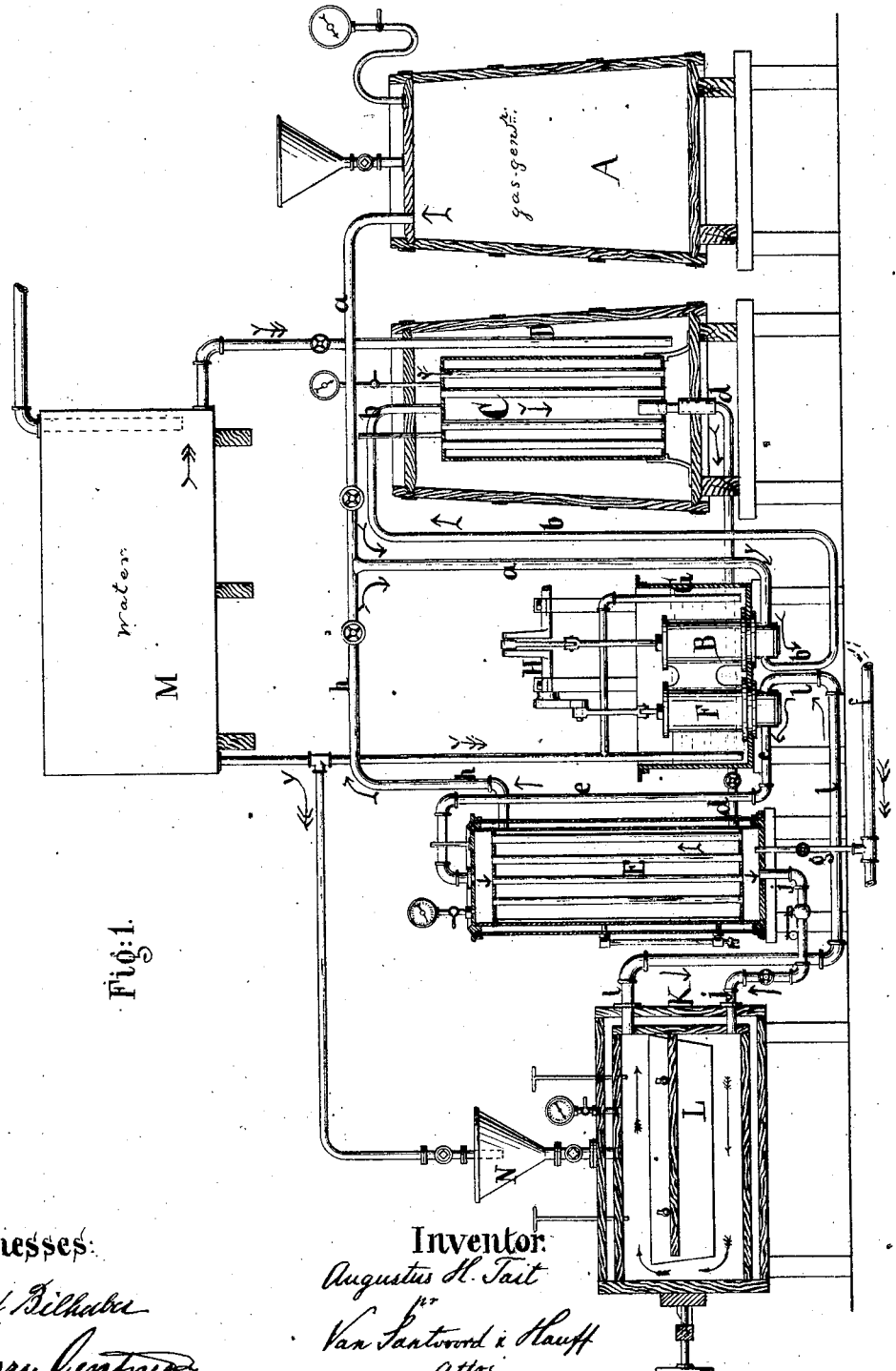

A. H. TAIT.
Ice-Machine.

No. 162,432.    Patented April 20, 1875.

Witnesses:
Ernst Bilhuber
Henry Gentner

Inventor:
Augustus H. Tait
per
Van Santvoord & Hauff
attys

THE GRAPHIC CO.PHOTO-LITH.39 & 41 PARK PLACE, N.Y.

UNITED STATES PATENT OFFICE.

AUGUSTUS H. TAIT, OF JERSEY CITY, NEW JERSEY.

IMPROVEMENT IN ICE-MACHINES.

Specification forming part of Letters Patent No. 162,432, dated April 20, 1875; application filed December 23, 1874.

*To all whom it may concern:*

Be it known that I, AUGUSTUS H. TAIT, of Jersey City, in the county of Hudson and State of New Jersey, have invented a new and useful Improvement in Cooling and in the Manufacture of Ice; and I do hereby declare the following to be a full, clear, and exact description thereof, which will enable those skilled in the art to make and use the same, reference being had to the accompanying drawing forming part of this specification, in which drawing—

Figure 4:
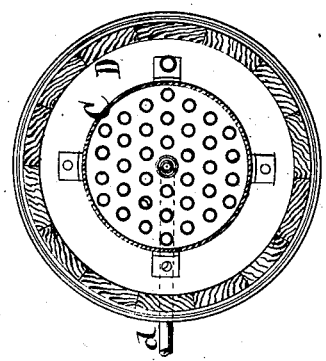
Figure 3:
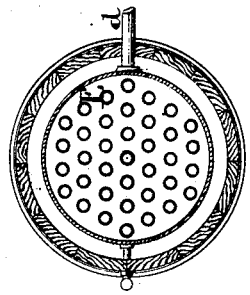
Figure 2:
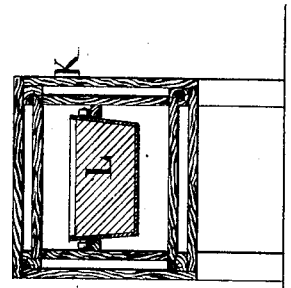

Figure 1 represents a longitudinal vertical section of my apparatus. Fig. 2 is a transverse section of the ice-box detached. Fig. 3 is a horizontal section of the gas-expanding and air-compressing cylinder. Fig. 4 is a similar section of the gas-compressing cylinder.

Similar letters indicate corresponding parts.

This invention consists in the process of cooling for the manufacture of ice, the same consisting in combining the cooling effect produced by the alternate condensation, cooling, and expansion of the vapors from a liquid having a low boiling-point, such as sulphite of carbon, with the cooling effect produced by the alternate compression, cooling, and expansion of atmospheric air. Further, the invention consists in the process of cooling for the manufacture of ice, the same consisting in combining the cooling effect produced by the alternate condensation, cooling, and expansion of a condensable gas, such as sulphurous acid, with the cooling effect produced by the alternate compression, cooling, and expansion of atmospheric air. Further, in a certain combination of parts for manufacturing ice, more particularly described and pointed out in the claims, whereby the cooling effect produced by the alternate condensation, cooling, and evaporation of a liquid of a low boiling-point, or of a condensable gas, and the cooling effect produced by the alternate compression, cooling, and expansion of atmospheric air, in such a manner that the temperature of the air during its compression can be lowered to 18°, or less, below the freezing-point of Fahrenheit, by means of the evaporation or expansion of the compressed liquid or gas, and that said temperature can be further reduced to 70° below the freezing-point, or —38° Fahrenheit, by allowing said air to expand. The cold air is allowed to expand in a chamber containing a shallow pan that is filled to the depth of about half an inch with water, and when this water is frozen, the resulting ice is withdrawn, and a fresh batch of water is admitted. The cold air circulates under and above the ice-pan.

In the drawing, the letter A designates a sulphurous-acid-gas generator of any desired construction. From this generator the gas passes through a pipe, $a$, to a pump, B, which serves to force the same through a pipe, $b$, into the compression-cylinder C. This cylinder is immersed in a water-tank, D, and it is provided with a series of tubes through which the water circulates, so that the gas on being forced into the cylinder C is cooled by contact with the outside walls thereof, and also by contact with the surfaces of the tubes, which are kept cool by the water circulating through them. The gas, being thus compressed and cooled, is reduced to a liquid state. From the compression-cylinder C the liquid gas passes, through a pipe, $d$, into a secondary tubular cylinder, E, (see Figs. 1 and 3,) which I term the gas-expanding cylinder. In this cylinder the liquid gas expands, so as to cool the compressed air, which is forced into and through the tubes of said gas-expanding cylinder, through a pipe, $e$, by means of a pump, F. The gas compressing and expanding cylinders C E are lined with sheet-lead, and their tubes are wiped with a mixture of lead and tin at the places where they are exposed to the action of the gas. The pumps B and F are situated side by side in a water-tank, G, and they are worked by a double crank-shaft, H, which receives a revolving motion from a steam-engine. This engine is supplied with steam through a pipe, $f$, situated beneath the floor of the apparatus, and from this steam-pipe extends a branch, $g$, into the gas-expanding cylinder E, so as to supply this cylinder with steam for the purpose of melting any ice which may form therein. The fluid gas expanding in the cylinder E, assumes a state of vapor, and this vapor escapes through a pipe, $h$, which connects with the gas-pump B so that said vapor commingles with the gas from the generator A, and is pumped back into the compression-cylinder C. The compressed and cooled air passes from the cylinder E through a pipe, $j$, directly into the freezing-chamber K, and is expanded under the ice-pan L suspended therein. After having passed around and over said pan, the expanded air escapes through a pipe, $l$, which carries it back to the air-pump F, when it is again forced into the tubes of the gas-expanding cylinder E, and recooled by the expanding gas. This continuous circulation or current is kept up until the ice has set or congealed, which is ascertained by a suitable gage or rod; then the current of air is stopped by suitable valves until the ice has been removed from the pan, and replaced by a fresh supply of water. The water for freezing, as well as for the tank of the compressing-cylinder and of the pumps B and F, is obtained by connection from the elevated main or reservoir M, which is kept well filled. The supply of water to the ice-pan L in the freezing-chamber is regulated by means of measuring-funnels N, which are of such capacity that they will fill the pan to the depth of about half an inch at a time. By thus freezing the water in shallow batches, I obtain clear cakes of ice, resembling in every respect clear cakes of natural ice.

What I claim as new, and desire to secure by Letters Patent, is—

1. The within-described process of cooling for the manufacture of ice, the same consisting in combining the cooling effect produced by the alternate condensation, cooling, and expansion of the vapors from a liquid having a low boiling-point, such as sulphite of carbon, with the cooling effect produced by the alternate compression, cooling, and expansion of atmospheric air, substantially in the manner herein shown and described.

2. The within-described process of cooling for the manufacture of ice, the same consisting in combining the cooling effect produced by the alternate condensation, cooling, and expansion of a condensible gas, such as sulphurous acid, with the cooling effect produced by the alternate compression, cooling, and expansion of atmospheric air, substantially in the manner herein shown and described.

3. The gas-generator A, pump B, and compression-cylinder C, surrounded by water-tank D, for compressing and reducing the gas to a liquid state, in combination with the expanding-cylinder E, pump F, and the freezing-chamber L, substantially as described, for the purpose specified.

This specification signed by me this 26th day of February, 1874.

A. H. TAIT.

Witnesses:
W. HAUFF,
E. F. KASTENHUBER.